3,137,677
POLYMERS OF DICHLOROALKYL BENZENE AND A PHENOL AND PROCESS OF PREPARING SAME
Nicholas C. Bolgiano, Lancaster, Pa., assignor to Koppers Company, Inc., a corporation of Delaware
No Drawing. Filed Sept. 15, 1959, Ser. No. 839,998
14 Claims. (Cl. 260—61)

This invention relates to a new class of polymers, the reaction products of phenol or phenol derivatives with 1-phenyl-1,2-dichloroethane or derivatives thereof and to methods for their preparation.

Phenol-formaldehyde resins, or as they are sometimes termed, phenolics, constitute a large segment of the total amount of plastic materials produced. These phenolics are primarily used in the manufacture of molding materials and as casting resins. Other large uses of phenolics are as adhesives, industrial coatings, fiberglass mat binders, and pulp and paper molding additives.

The use of phenolics as adhesives and coatings, fiberglass mat binders, and paper additives, however, has certain drawbacks and limitations which prevent even wider use. In the field of industrial coatings, for instance, phenolics are not compatible with drying oils which might be used to formulate superior coatings. In the use of phenolic resins as binders for fiberglass mat insulation, a major disadvantage is that the phenolics tend to burn during the heating used in the curing of these mats. As ingredients for adhesives and binders, phenolics' principal drawback is a short shelf life.

The present invention describes a superior polymer, the reaction product of phenol and phenol derivatives, with 1-phenyl-1,2-dichloroethane or derivatives thereof which overcomes these shortcomings of the phenolic resins in the above applications, and in addition thereto is of utility in other applications. One of the polymers of the present invention, the product obtained from the interaction of alpha,beta-dichloroethylbenzene with phenol, is valuable as an antioxidant; another, alpha,beta-dichloroethylbenzene-catechol polymer may be utilized as an electron exchange resin, while others are useful as wood preservatives. Further, all of these resins are useful intermediates in the production of a high melting, greater than 300° C., polymer.

The polymers of this invention may be prepared in a relatively simple manner by reacting a 1-phenyl-1,2-dichloroethane or derivative thereof with phenol or a phenol derivative to produce polymers of a type not heretofore known. The ratio of reactants can vary from one half mol of 1-phenyl-1,2-dichloroethane or derivative thereof to three mols of 1-phenyl-1,2-dichloroethane or derivatives thereof per mol of phenol or phenol derivative. The reaction temperature varies with the reactants, but is in the range of from 50–250° C. However, final reaction temperatures of about 150° C. are preferred. A catalyst such as zinc chloride, ferric chloride, aluminum chloride, or similar inorganic halides may be used if desired, although it is not essential.

The simplest 1-phenyl-1,2-dichloroethane is alpha,beta-dichloroethylbenzene. This material may be readily prepared by reacting styrene with chlorine in the presence of carbon tetrachloride. Other styrene derivatives can be similarly reacted to form their dichlorinated derivatives, e.g., alpha methylstyrene, the derivatives of t-butylstyrene, dimethyl styrene, vinyl naphthalene, vinyl pyridine, vinyl carbazole, etc.

Phenol as well as its derivatives such as hydroquinone, cresol, xylenol, naphthol, resorcinol, catechol, etc. may be used in the practice of the invention.

In a typical preparation, for instance, alpha-beta-dichloroethylbenzene and phenol are mixed and zinc chloride added to the mixture. The mixture is then heated to a temperature of 150–233° C. with agitation. Hydrogen chloride gas is evolved during this time. Thereafter, the reaction mass is cooled to a solid resinous mass, and powdered. This mass is refined by dissolving it in an aqueous alkali medium and then precipitating the polymer by adding hydrochloric acid to the medium. The polymer is soluble in acetone, benzene and 10% sodium hydroxide.

Polymers such as prepared above may be further reacted with formaldehyde to give insoluble polymers which have a melting point of greater than 300° C. Such a high melting polymer is prepared by heating a stirred mixture of the above polymer, formaldehyde and water together with a sodium hydroxide catalyst to form a solid phase, which is separated, powdered, washed with water and then air dried. The resulting polymer was insoluble in acetone and had a softening point greater than 300° C.

The following examples illustrate the preparation of the new type polymers, but are not limitative of the invention.

*Example I*

A mixture of 67.5 (0.7 m.) of phenol and 125 g. (0.7 m.) of alpha,beta-dichloroethylbenzene was heated at 145–150° C. for 6 hours and then at 165° C. for 1 hour. Hydrogen chloride was evolved. The resulting product was then distilled to give 36 g. of a material having a boiling point of 70–80° C. at 10 mm. pressure, plus 113 g. of residue which solidified on standing. The distillate was found to contain principally a solution of unreacted phenol (13 g.) and beta-chlorostyrene (23 g.).

The residue was soluble in benzene, acetone, methanol, and ethanol, but insoluble in hexane. The resin was recoverable from the solution by evaporation.

A solution of 60 g. of the crude resin in 200 cc. of 10% sodium hydroxide was acidified to pH 4 with 10% hydrochloric acid. The precipitate was washed with concentrated hydrochloric acid followed by water, and dried at 75° C. and 1 mm. to give 52 g. of resin, having a softening point of 75° C. This resin has the following structure:

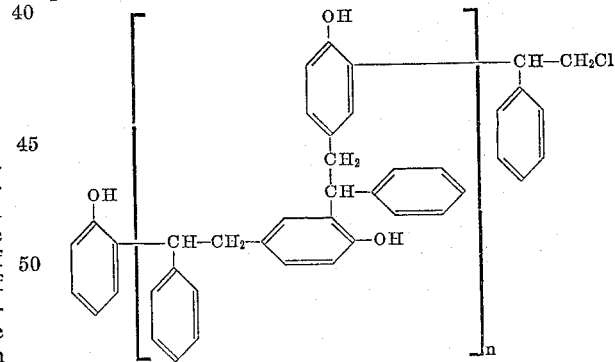

$n$ being greater than 10.

*Example II*

To a stirred mixture of 17 g. of phenol (0.2 m.) and 32 g. of alpha,beta-dichloroethylbenzene (0.2 m.) was added 5 g. of anhydrous zinc chloride. Copious evolution of hydrogen chloride began immediately and the temperature rose from 45° C. to 60° C. The mixture was stirred at 170° C. for 10 minutes, cooled and dissolved in 200 cc. of 10% sodium hydroxide. The mixture was acidified with 10% hydrochloric acid and filtered; the precipitate was washed successively with water, concentrated hydrochloric acid, and water; finally dried at 25° C. and 1 mm. pressure. The resulting resin, 28 g. (78% yield), softened at 108° C.

*Example III*

A stirred mixture of 79 g. (0.84 m.) of phenol, 147 g.

(0.84 m.) of alpha,beta-dichloroethylbenzene and 1 g. of anhydrous zinc chloride was heated to 60° C. in an 800 cc. beaker. Hydrogen chloride was evolved. The temperature was raised to 170° C. during 15 minutes and maintained at 170° C. for ten minutes. The heating was then discontinued and the mixture cooled. After cooling the mixture was dissolved in 1000 cc. of 10% aqueous sodium hydroxide and the mixture was filtered. The filtrate was acidified with concentrated hydrochloric acid to about pH 1 and the precipitate after filtering was slurried twice with 2000 cc. portions of warm (70° C.) water. Upon separation the product was air dried for 12 hours and subsequently in an oven at 50–60° C. at 20 mm. pressure for 10 hours to give 137 g. (83% yield) of resin; M.P. 120–125° C. The product was soluble in acetone.

*Example IV*

In a 400 cc. beaker was placed 55.6 g. (0.32 m.) of alpha,beta-dichloroethylbenzene, 15 g. (0.16 m.) of phenol, and 0.2 g. of anhydrous zinc chloride catalyst. The mixture was stirred and heated at 140–145° C. for 19 minutes. The polymer was separated as in Example II and thereafter powdered and added to 200 cc. of acetone. A nonfilterable gel was obtained. The product was poured into a porous plate and allowed to stand for 72 hours. The product, after powdering, weighed 40 g. (84% yield); it softened at 130–135° C. The product was insoluble in 10% aqueous sodium hydroxide, acetone, and benzene. Because of the gel formation it is believed to be cross-linked.

*Example V*

To a stirred, warm (65° C.) mixture of 20 g. of resorcinol (0.2 m.) and 31.5 g. of alpha,beta-dichloroethylbenzene (0.2 m.) was added 0.1 g. of anhydrous zinc chloride. The temperature of the mixture rose to 90° C. and hydrogen chloride was evolved. The mixture was heated at 180° C. for five minutes, cooled, and dissolved in 200 cc. of 10% sodium hydroxide. Neutralization to pH 8 with 10% hydrochloric acid gave an orange-red solid which was separated by filtration. Half of this material, after washing with deionized water until the washings were neutral to litmus, was dried at 1 mm. pressure and room temperature for 24 hours to give 16 g. of a product with a softening point of 125–130° C. It was soluble in acetone and benzene, and slightly soluble in water.

The remainder of the resin was added to 100 cc. of concentrated hydrochloric acid and stirred for 10 minutes; then washed with deionized water until the wash was neutral to litmus. The product was dried at 1 mm. pressure and room temperature for 25 hours. It softened at 120–125° C. and was soluble in acetone and benzene, and slightly soluble in water. The total yield of resin was 31 g. (84%).

This resin has the following structure:

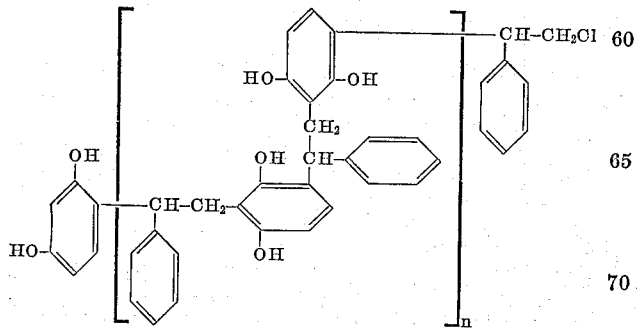

$n$ being greater than 10.

*Example VI*

A stirred mixture of 120 g. (0.69 m.) of alpha-beta-dichloroethylbenzene, 75.5 g. (0.69 m.) of resorcinol, and 0.1 g. of fused zinc chloride was heated to 60° C. Hydrogen chloride was evolved. The temperature was raised to 180° C. during 15 minutes. After heating at 180° C. for 5 minutes the product (137 g.) was cooled, powdered, and dissolved in 1000 cc. of 10% aqueous sodium hydroxide. The filtrate was acidified with concentrated hydrochloric acid to give a gummy mass which solidified on standing. The product was powdered and stirred with concentrated hydrochloric acid for 4 hours. The solid was separated, washed and thereafter slurried twice with 1000 cc. portions of water and then air dried for 25 hours to give 103 g. (71% yield) of resin, M.P. 120–125° C. The product was slightly soluble in water and soluble in acetone.

*Example VII*

To a stirred mixture of 78 g. (0.71 m.) of catechol, and 123 g. (0.71 m.) of alpha-beta-dichloroethylbenzene at 60° C. was added 1 g. of anhydrous zinc chloride. There was a vigorous evolution of hydrogen chloride. The mixture was heated to 150° C. during 15 minutes and became too viscous to stir manually. On continued heating at 150–169° C. for five minutes the product liquidified. The temperature was then raised to 180–190° C. during 5 minutes and held at 180–190° C. for 2 minutes. The heating was then discontinued and the product cooled. The cooled product was powdered and dissolved in 600 c. of 10% aqueous sodium hydroxide and the solution was filtered. The resin was precipitated with 20% hydrochloric acid. The product was powdered and stirred with 500 cc. of concentrated hydrochloric acid for 4 hours. The solid was subsequently washed with water and dried at 20 mm. and 60° C. for 6 hours to give 130 g. (87% yield) of a violet resin having an M.P. of 100–110° C. The resin was soluble in acetone and only slightly soluble in benzene.

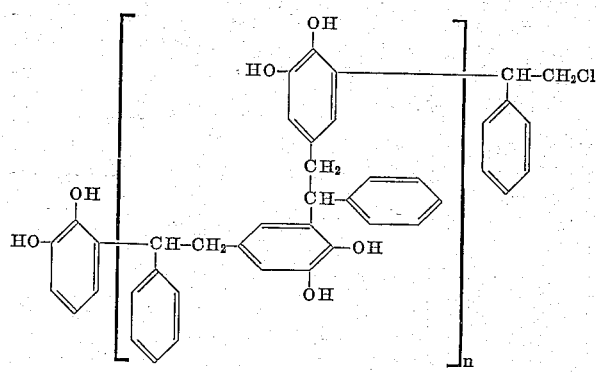

$n$ being greater than 10.

The resin has the above structure.

*Example VIII*

A stirred mixture of 73 g. (0.67 m.) of resorcinol, 125 g. (0.67 m.) of 1,2-dichloro-2-phenylpropane and 1 g. of anhydrous zinc chloride was heated to 60° C. in an 800 cc. beaker. Hydrogen chloride was evolved. The mixture was heated to 230° C. during 20 minutes. Hydrogen chloride evolution continued and the mixture became homogeneous. The reaction of 1,2-dichloro-2-phenylpropane with resorcinol appeared to be less vigorous than that of alpha,beta-dichloroethylbenzene with resorcinol. After heating at 230° C. for 5 minutes, the product was cooled and powdered to give 135 g. of a resin having a melting point of 75–80° C. The product was dissolved in 3000 cc. of 10% aqueous sodium hydroxide and the filtrate was acidified with concentrated hydrochloric acid. The precipitate was washed with water, then stirred with 300 cc. of concentrated hydrochloric acid for 4 hours. The solid was filtered off, washed with water, and dried at 20 mm. pressure and 70° C. for 12 hours to give 100 g. (67% yield) of a resin having a melting point of 95–105° C. The deep-red product was soluble in acetone and insoluble in benzene.

The above examples illustrate the preparation of several of the resins of the invention using various conditions, e.g., both with and without the use of catalyst and at varying mol ratios of reactants. The examples also illustrate several of the many combinations of reactants which may be used in the practice of the invention.

The properties of several of the above polymers as antioxidants was determined by observing their effect on the oxygen stability of lard.

Inhibited lard was tested using the Active Oxygen Method. In this test a 20 gram sample is oxidized at 98° C. by a constant flow of purified air. The oxidation of the sample is followed by a peroxide number. The time and hours required to reach a peroxide number of 20 is considered a measure of stability. This value, 20, is the point where rancidity becomes noticeable, and if a compound has any antioxidant properties it becomes evident under these test conditions. As a comparison one sample using no inhibitor was used, and another using DBPC (2,6,di-tert-butyl-paracresol), a widely used antioxidant, were used. The results are set forth in the table below. The only one with strong antioxidant properties was the alpha,beta-dichloroethylbenzene-catechol polymer.

|  | AOM Test Hours | Inhibitor Factor [1] |
|---|---|---|
| Alpha,beta-dichloroethylbenzenecatechol | 86.6 | 18.8 |
| DBPC | 38.3 | 8.3 |
| No inhibitor | 4.6 | |

[1] Hours inhibited/hours uninhibited.

Example IX

A stirred mixture of 19.7 g. of alpha,beta-dichloroethylbenzenephenol resin (prepared in Example II), 22 g. of 37% formaldehyde, 0.5 g. of sodium hydroxide, and 15 g. of water was heated to 80° C. during 10 minutes. After heating at 80–90° C. for 5 minutes the solid phase was separated, dried, powdered, washed with water, and air-dried for 4 hours to give 21 g. of material, melting point greater than 300° C. The product was insoluble in acetone.

Example X

To a stirred solution of 5 g. of alpha,beta-dichloroethylbenzeneresorcinol resin (prepared as in Example V) 3 g. of sodium hydroxide, and 20 g. of water was added 13.5 g. of 37% formaldehyde in one portion. A precipitate formed immediately. The mixture was warmed at 80–90° C. for 5 minutes. The precipitate was separated, washed with water, and air dried at 80° C. for one hour to give 5 g. of material, melting point higher than 300° C. The product was insoluble in acetone.

The latter two examples are illustrative of the production of high melting polymers using as one component thereof the lower melting point polymer. These polymers are though to be cross-linked and because of their high softening point would be extremely useful in high temperature applications.

Example XI

A stirred mixture of 66 g. (0.6 m.) of hydroquinone, 105 g. (0.6 m.) of alpha,beta-dichloroethylbenzene and 0.5 g. of anhydrous zinc chloride was heated to 150° C. during 10 minutes. Hydrogen chloride was evolved. After heating at 150–160° C. for 10 minutes the product was cooled and powdered in a mortar to give 125 g. (98% yield) of polymer. The product was dissolved in a liter of 10% sodium hydroxide. The solution was filtered and the polymer precipitated by acidification with hydrochloric acid. The solid was washed with water and air-dried to give 109 g. (86% yield) of brown polymer; softening point 105–115° C. The product was soluble in acetone, but only slightly soluble in benzene.

Example XII

A stirred mixture of 65 g. (0.6 m.) of p-cresol, 105 g. (0.6 m.) alpha,beta-dichloroethylbenzene, and 0.5 g. of zinc chloride was heated to 190° C. during 10 minutes and maintained at 190–200° C. for 5 minutes. Hydrogen chloride was evolved. The cooled product was powdered in a mortar and stirred for 30 minutes with one liter of 10% sodium hydroxide. The mixture was acidified with hydrochloric acid and the polymer was washed with water. The product was air-dried to give 127 g. (99% yield) of resin, softening point 55–65° C.

The above experiment was repeated except that 65 g. (0.6 m.) of o-cresol was used instead of p-cresol. The product was air-dried to give 111 g. (89% yield) of an orange-red polymer; softening point 45–55° C.

Example XIII

A stirred mixture of 86.5 g. (0.6 m.) of alpha-naphthol, 105 g. (0.6 m.) of alpha,beta-dichloroethylbenzene and 0.5 g. of anhydrous zinc chloride was heated to 180° C. during 10 minutes. Hydrogen chloride was evolved. After heating at 180—190° C. for 10 minutes the product was cooled and powdered to give 134 g. (91% yield) of resin. The powder, after stirring with one liter of 10% sodium hydroxide, was acidified with hydrochloric acid, washed with water and air-dried for 4 days to give 161 g. (109 wt. percent yield) of a resin having a softening point of 85–100° C.

To demonstrate the utility of the above alpha,beta-dichloroethylbenzene-hydroquinone resin as an electron exchange resin the following procedure was used. One gram of the resin was dissolved in 30 cc. of 90% aqueous acetic acid. In this solution were soaked 5.5 cm. disks of Whatman No. 1 filter paper, and then a dried disk was placed between two plates of glass, the upper plate having a small hole at the center through which reagents could be introduced. To examine the paper the upper plate was removed and the paper spotted or streaked from the center outward with various test reagents.

A few drops of 0.5 N. aqueous ferric chloride were run into the paper. An orange zone of oxidized polymer formed. A few drops of 1 N sulfuric acid washed the reagent out of this zone. The top plate was then removed and the paper streaked with reagents. Potassium ferric cyanide, 0.5 N, gave Turnbull blue; 2 N potassium ferrocyanide gave a pale blue streak which intensified on standing; a 50% aqueous acetic acid solution of alpha-nitroso-beta-naphthol gave a green color. Untreated filter paper showed no reduction of ferric ion under the conditions of the test. These results are clear evidence of the reduction of the ferric ion to the ferrous ion.

Another dried disk was inserted between the plates and a few drops of 0.5 N potassium ferricyanide in a pH of 6.6 phosphate buffer were run into the paper. A pink zone (presumably oxidized resin) formed. This was washed with a few drops of pH 6.6 buffer. Tests with various reagents showed reduction of ferricyanide to ferrocyanide: 0.5 N silver nitrate gave a brown color at the outside edge of the zone; ferric chloride (0.5 N) gave Prussian blue at the peripheral zone; 0.5 N cuprous chloride gave brown at the periphery.

The reversible nature of the oxidation-reduction reaction was demonstrated by the following experiment. A small drop of iodine in potassium iodide solution at pH 6.6 (0.5 N with respect to iodine and potassium iodide) was placed on a treated disk. A brownish-black zone formed. When more of the pH 6.6 buffer was introduced the zone broadened and the color disappeared as the iodine was reduced by the resin. At this point, if the top plate was removed, no test for free iodine could be obtained with starch-iodide solution. A drop of 1 N sulfuric acid was introduced. No reaction occurred. However, on introducing a drop of 0.5 N potassium iodide solution in 1 N sulfuric acid, the iodide was immediately oxidized to brown iodine by the oxidized resin. This was confirmed by a strong blue starch test. Thus the resin was oxidized by iodine in potassium iodide in neutral solution, and this oxidized resin, which remained in situ on the paper, oxidized iodide to iodine in acid solution.

The above examples illustrate the usefulness of the new polymers of this invention. To recapitulate, the alpha,beta-dichloroethylbenzene-catechol may be used as an antioxidant, the alpha,beta-dichloroethylbenzene-hydroquinone has an oxidation-reduction capacity resin, and all are useful as intermediates in the production of other resins.

I claim:

1. A method of making a polymer containing only carbon to carbon bonds in the polymer chain comprising reacting at a temperature of 50–250° C. a dichloroalkylbenzene selected from the group consisting of 1-phenyl-1,2-dichloroethane and 1,2-dichloro-2-phenylpropane with a phenolic compound having the formula:

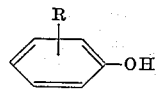

wherein R is a member selected from the group consisting of methyl, hydroxy and hydrogen, the mol ratio of said dichloralkylbenzene to said phenolic compound being from 0.5:1 to 3:1.

2. A process for preparing a polymer comprising reacting one half to three mols of alpha,beta-dichloroethylbenzene with one mol of phenol at a temperature of at least 150° C.

3. A process for preparing a polymer comprising reacting one half to three mols of alpha,beta-dichloroethylbenzene with one mol of resorcinol at a temperature of at least 150° C.

4. A process for preparing a polymer comprising reacting one half to three mols of alpha,beta-dichloroethylbenzene with one mol of catechol at a temperature of at least 150° C.

5. A process for preparing a polymer comprising reacting one half to three mols of 1,2 dichloro-2 phenylpropane with one mol of resorcinol at a temperature of at least 150° C.

6. A polymer having the structure:

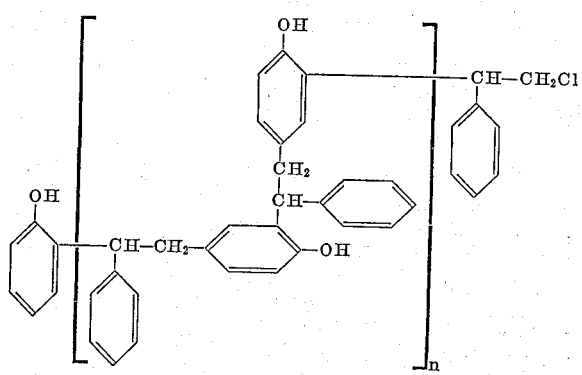

where $n$ is an integer greater than 10.

7. A polymer having the structure:

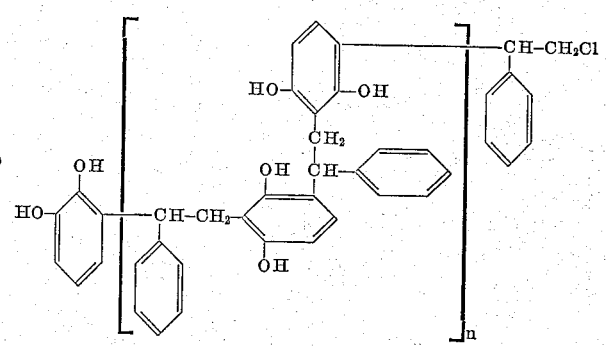

where $n$ is an integer greater than 10.

8. A polymer having the structure:

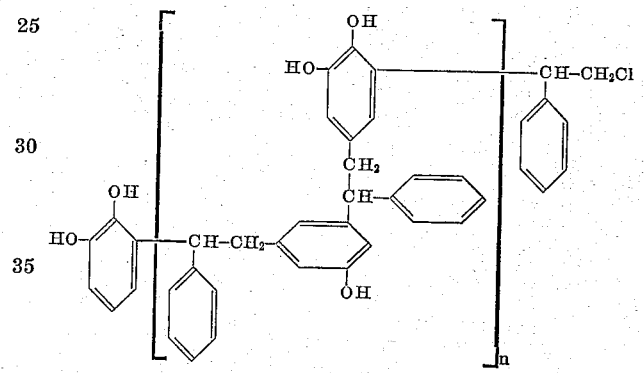

where $n$ is an integer greater than 10.

9. A method of making an insoluble resin comprising reacting at a temperature of 50–250° C., a dichloroalkylbenzene selected from the group consisting of 1-phenyl-1,2-dichloroethane and 1,2-dichloro-2-phenylpropane with a phenolic compound having the formula:

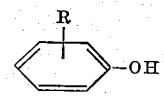

where R is a member selected from the group consisting of methyl, hydroxy and hydrogen to form a polymer, the mol ratio of said dichloroalkylbenzene to said phenolic compound being from 0.5:1 to 3:1, and crosslinking said polymer with formaldehyde at a temperature above 70° C.

10. A polymer prepared by reacting an alpha,beta-dichloroethylbenzene phenol polymer with formaldehyde.

11. A polymer prepared by reacting an alpha,beta-dichloroethylbenzene resorcinol polymer with formaldehyde.

12. An antioxidant comprising the reaction product of alpha,beta-dichloroethylbenzene and catechol.

13. An electron exchange resin comprising the reaction product of alpha,beta-dichloroethylbenzene and hydroquinone.

14. A method of making a polymer containing only carbon to carbon bonds in the polymer chain comprising reacting in the presence of a metal halide catalyst and at a temperature of 50–250° C. a dichloroalkylbenzene selected from the group consisting of 1-phenyl-1,2-dichloroethane and 1,2-dichloro-2-phenylpropane with a phenolic compound having the formula:

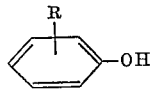

wherein R is a member selected from the group consisting of methyl, hydroxy and hydrogen, the mol ratio of said dichloroalkylbenzene to said phenolic compound being from 0.5:1 to 3:1.

References Cited in the file of this patent
UNITED STATES PATENTS

| | | |
|---|---|---|
| 2,060,715 | Arvin | Nov. 10, 1936 |
| 2,247,402 | Perkins et al. | July 1, 1941 |
| 2,315,556 | Soday | Apr. 6, 1943 |
| 2,542,111 | Bloch | Feb. 20, 1951 |